United States Patent
Zwolinski

(10) Patent No.: US 6,208,435 B1
(45) Date of Patent: Mar. 27, 2001

(54) METHOD AND APPARATUS FOR PROVIDING A HANDHELD SCANNER-DICTIONARY APPARATUS

(76) Inventor: Jan Scott Zwolinski, HC 52, Box 831, Graford, TX (US) 76449

( * ) Notice: Subject to any disclaimer, the term of this patent is extended or adjusted under 35 U.S.C. 154(b) by 0 days.

(21) Appl. No.: 09/047,270

(22) Filed: Mar. 24, 1998

Related U.S. Application Data

(60) Provisional application No. 60/041,534, filed on Mar. 25, 1997.

(51) Int. Cl.[7] .................................................. H04N 1/024
(52) U.S. Cl. ........................................... 358/473; 382/313
(58) Field of Search .................................... 382/229, 231, 382/313, 314; 703/3, 4; 358/473

(56) References Cited

U.S. PATENT DOCUMENTS

| | | | |
|---|---|---|---|
| 4,658,374 | * 4/1987 | Tanimoto et al. | 364/900 |
| 4,782,464 | * 11/1988 | Gray et al. | 364/900 |
| 5,063,508 | * 11/1991 | Yamada et al. | 364/419 |
| 5,175,684 | * 12/1992 | Chong | 364/419 |
| 5,301,243 | * 4/1994 | Olschafskie et al. | 382/59 |
| 5,523,943 | * 6/1996 | Maruta et al. | 364/419.04 |
| 5,648,760 | * 7/1997 | Kumar | 340/825.25 |
| 5,854,997 | * 12/1998 | Sukeda et al. | 704/3 |
| 5,917,944 | * 6/1999 | Wakisaka et al. | 382/190 |
| 5,929,774 | * 7/1999 | Charlton | 340/825.44 |

OTHER PUBLICATIONS

Printout of product Specification of The Quicktionary Handheld OCR Pen/Dictionary from www.worldlanguage.com, Sep. 1, 1999.*
Printout of product Specification of The Electronic Deictionary w/speech from www.worldlanguage.com, Sep. 1, 1999.*
1998 Franklin Rolodex Electronics Bookman Catalog.

* cited by examiner

*Primary Examiner*—Cheukfan Lee
(74) *Attorney, Agent, or Firm*—Melvin A. Hunn

(57) ABSTRACT

A handheld scanning dictionary is provided. It includes a relatively small housing adapted in size to be held in one hand by a user during use. A scanning input is carried by the housing preferably at a tapered distal end of the housing, which allows text to be scanned as input during a wanding movement of a scanning input mode of operation, with a scanning input in contact with the text, and with the elongated housing held in one hand by the user and oriented generally transverse to a surface which carries such text. The elongated housing is maintained out of contact with the surface which carries the text. A display is carried by the housing in general alignment with the longitudinal axis of the housing. The controller is disposed within the housing and operatively coupled to the scanning input and the display. A program is provided which is composed of instructions which are executable by the controller. It operates to receive as an input text scanned by the scanning input and to provide as an output on the display text which is logically related to the input text in a predetermined manner. Preferably the output text is displayed on the generally elongated display in an orientation which is in general alignment with the longitudinal axis of the elongated housing with the left-most portion of the output text located in a position generally proximate the scanning input, thereby allowing the handheld scanning dictionary to be read by the user while holding one hand during use.

17 Claims, 5 Drawing Sheets

METHOD AND APPARATUS FOR PROVIDING A HANDHELD SCANNER-DICTIONARY APPARATUS

CROSS-REFERENCE TO RELATED APPLICATION

This application claims the benefit of U.S. Provisional Patent Application Ser. No. 60/041,534; filed Mar. 25, 1997, entitled Method and Apparatus for Providing a Handheld Scanner-Dictionary Apparatus.

BACKGROUND OF THE INVENTION

1. Field of the Invention

The present invention relates in general to portable electronic devices, and particularly to portable electronic devices which are useful for providing dictionary and/or translation functions for a reader.

2. Description of the Prior Art

Readers frequently incur words in reading material which they do not fully understand. Their options are to utilize a conventional dictionary to look up the words, or a handheld keypad-type dictionary device in order to look up the words electronically. Both have their disadvantages. The conventional dictionary requires a reader to manipulate a relatively cumbersome device and locate the entry by turning pages. The electronic device requires the reader to directly key in the word for which he/she seeks a definition.

SUMMARY OF THE INVENTION

It is one objective of the present invention to provide a portable handheld device which combines the functions of a scanner with a portable electronic dictionary device with an LCD or other display for displaying the definition of the word that has been scanned in with the device.

It is another objective of the present invention to provide the handheld scanner dictionary with an optional keypad operation which allows the user to physically manipulate a keypad or to utilize a stylus and a graphical user interface keypad in order to key in the word for which a definition is sought.

It is another objective of the present invention to provide a handheld scanner-dictionary which includes an alternative voice operation which utilizes a microphone and a speech-to-text module to receive a word as an input. The handheld scanner-dictionary will then retrieve the definition and either voice-announce the definition or display the definition in an LCD display, or a combination of voice-announce and display.

It is another objective of the present invention to combine the above-identified features of the handheld scanner-dictionary with a conventional pager.

It is another objective of the present invention to provide the above-identified handheld scanner-dictionary with a translation function which fetches a foreign language definition of a particular word that is input into the device.

It is yet another objective of the present invention to provide the above-identified handheld scanner-dictionary with conventional clock and alarm functions.

DETAILED DESCRIPTION OF THE INVENTION

The handheld scanner-dictionary of the present invention is a device which makes it easy for a reader to "look up" a word encountered during reading with which the reader is unfamiliar or for which the reader desires a precise definition. The handheld scanner-dictionary of the present invention is greatly advantageous over the prior art in that it is easy to use and thus encourages and enhances the reader's quest for an increased or enhanced vocabulary.

The handheld scanner-dictionary of the present invention includes several modes of operation. In a scanning input mode of operation, a scanning device is utilized to scan text into the handheld scanner-dictionary, much in the way that a handheld bar code reader is used to "wand" product information into a cash register. The handheld scanner-dictionary will fetch from memory a dictionary definition corresponding to the scanned word. The dictionary definition is provided to the reader through either an LCD display and/or an audio output device, such as a speaker. This way, the reader may either read the definition or hear the definition, whichever is more convenient.

Another mode of operation is a keypad input mode of operation in which a keypad is utilized to input the word for which a definition is sought. A detachable keyboard may be utilized to physically input the characters of the word for which a definition is sought. Alternatively, a graphical user interface may be provided in the LCD display, which operates as a touch screen. A graphical display of a keyboard may be displayed in the LCD device, and the operator may utilize a stylus to sequentially enter the letters which make up the word for which a definition is sought.

In yet another alternative mode of operation, the handheld scanner-dictionary may be operated in a manner which allows for the voice input of the word for which a definition is sought. In this mode of operation, a microphone and speech-to-text module is utilized to determine the input word for which a definition is sought.

Several alternative operations are also provided in the handheld scanner-dictionary, such as: a pager mode of operation, a translation mode of operation, and a clock/alarm mode of operation. These modes of operation and functions will now be described with reference to the figures.

Figure 1A:
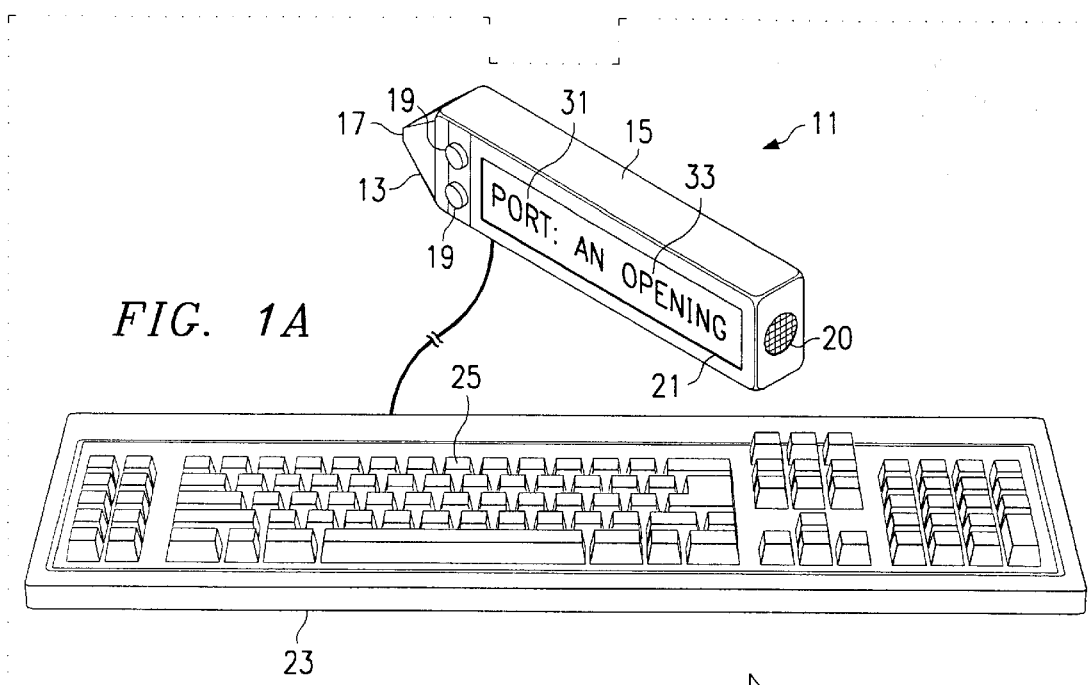
FIG. 1A is a pictorial representation of one particular embodiment of the handheld scanner-dictionary of the present invention with a detachable keyboard.

FIG. 1A is a pictorial representation of one embodiment of the handheld scanner-dictionary 11 of the present invention. As is shown, the handheld scanner-dictionary 11 includes a tapered end 13 which terminates at a scanner input 17, and an elongated rectangular portion 15 with user input buttons 19, display 21, and audio output device 20. In the view of FIG. 1A, display 21 is shown as displaying an input word 31 and associated definition 33. Also, as is shown in Figure IA, a detachable keyboard 23, which includes individually operable keys 25, is electrically connected to handheld scanner-dictionary 11. The word for which a definition is sought may be input through either scanner 17 or detachable keyboard 23. Audio output device 20 may serve a dual function: it may serve as a microphone, and it may serve as a speaker. When audio output device 20 serves as a microphone, the handheld scanner-dictionary 11 may be operated in a voice-input mode of operation wherein the user announces a word as an input to the handheld scanner-dictionary, and the handheld scanner-dictionary 11 utilizes speech-to-text conversion to generate the word, and then look up the definition of the word and either display it or generate an audio output of the definition.

Figure 1B:
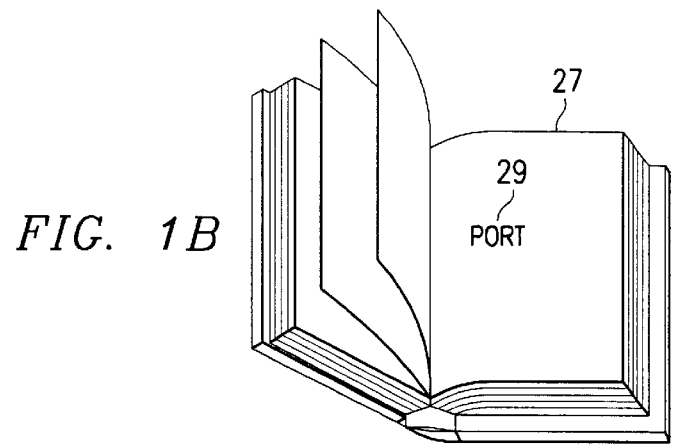
FIG. 1B is a pictorial representation of a book.

FIG. 1B is a pictorial representation of book 27. As is shown, book 27 includes textual material, including the word "port". In accordance with the present invention, the handheld scanner-dictionary 11 may be utilized to scan in the word "port" 29 and generate a definition either in display 21 or as an output from audio output device 20.

Figure 1C:
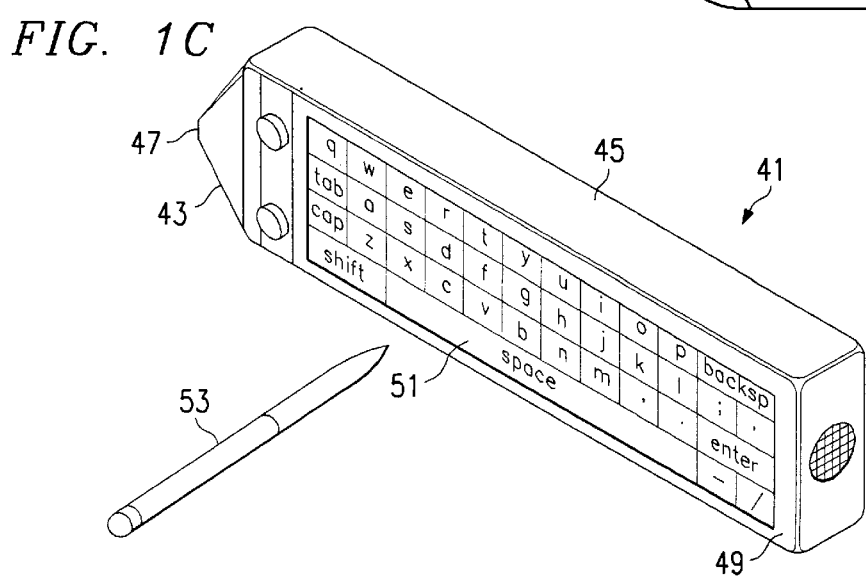
FIG. 1C is a pictorial representation of an alternative embodiment of the handheld scanner-dictionary with an enlarged display area which allows the utilization of a graphical user interface touch screen keyboard input device.

FIG. 1C depicts an alternative embodiment of the handheld scanner-dictionary 41, wherein tapered end 43 terminates at scanning input 47 and body section 45 is larger than in the previous embodiment in order to accommodate a larger display 49 which may be utilized to present a graphical user interface, touch screen display of a keypad. Graphical user interface display 51 displays the characters which may be selected through utilization of stylus 53 in a conventional manner.

Figure 2:
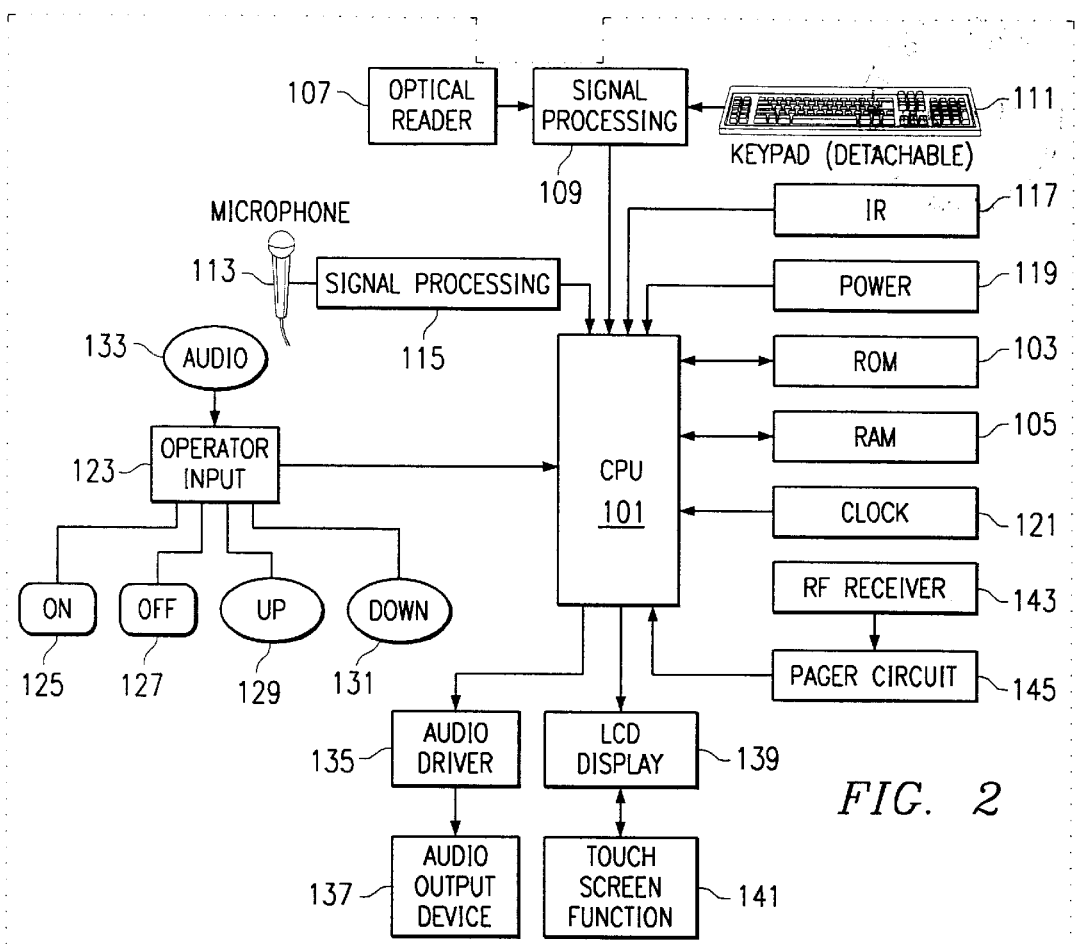
FIG. 2 is a block diagram representation of the preferred handheld scanner-dictionary of the present invention.

FIG. 2 is a block diagram representation of the components which make up handheld scanner-dictionary 11, 41 of FIGS. 1A and 1C. The handheld scanner-dictionary includes a central processing unit 101 and associated power circuit 119, clock circuit 121, ROM 103, and RAM 105, as is conventional. CPU 101 is also communicatively coupled to infrared receiver/transmitter 117 which may be utilized in a conventional manner to communicate through an infrared link to a desktop or laptop computer in order to exchange data. Optical reader circuit 107 is provided, which provides its output to signal processing circuit 109. Characters may be scanned utilizing the optical reader circuit 107. The signal is processed at signal processing circuit 109 and provided to central processing unit 101. CPU 101 is also connected to microphone 113 through signal processing circuit 115. In the voice-input mode of operation, microphone 113 is utilized to detect voice-enunciated words. Signal processing circuit 115 utilizes a conventional speech-to-text system to generate a textual word from the detected voice input, and provide that textual word to CPU 101. CPU 101 is also connected to operator input 123 which includes a number of dedicated buttons for commanding and controlling the handheld scanner-dictionary. Such buttons include "On" button 125, "Off" button 127, "Scroll Up" button 129, "Scroll Down" button 131, "Audio On" button 133, and any other conventional or novel command buttons that are desired. CPU 101 is also connected to audio driver 135 which drives audio output device 137. When the operator selects the "Audio On" button, CPU 101 will generate signals which actuate audio driver 135 to energize audio output device 137 to provide a voice definition for the particular word selected. CPU 101 is also connected to LCD display 139 which provides a display of the definition of the word received as an input at the handheld scanner-dictionary device. A touch screen function 141 is provided in order to allow a stylus to be utilized to interact with a graphical user interface in order to key in the characters which make up an input word. Alternatively, CPU 101 is connected to detachable keypad 111 which may be utilized for typing in the input word. As is discussed above, the handheld scanner-dictionary of the present invention may be utilized in combination with a pager. In this particular function, an RF receiver 143 is provided which communicates with paging circuit 145 which is communicatively coupled to CPU 101. The pager operates in a conventional manner.

Figure 3A:
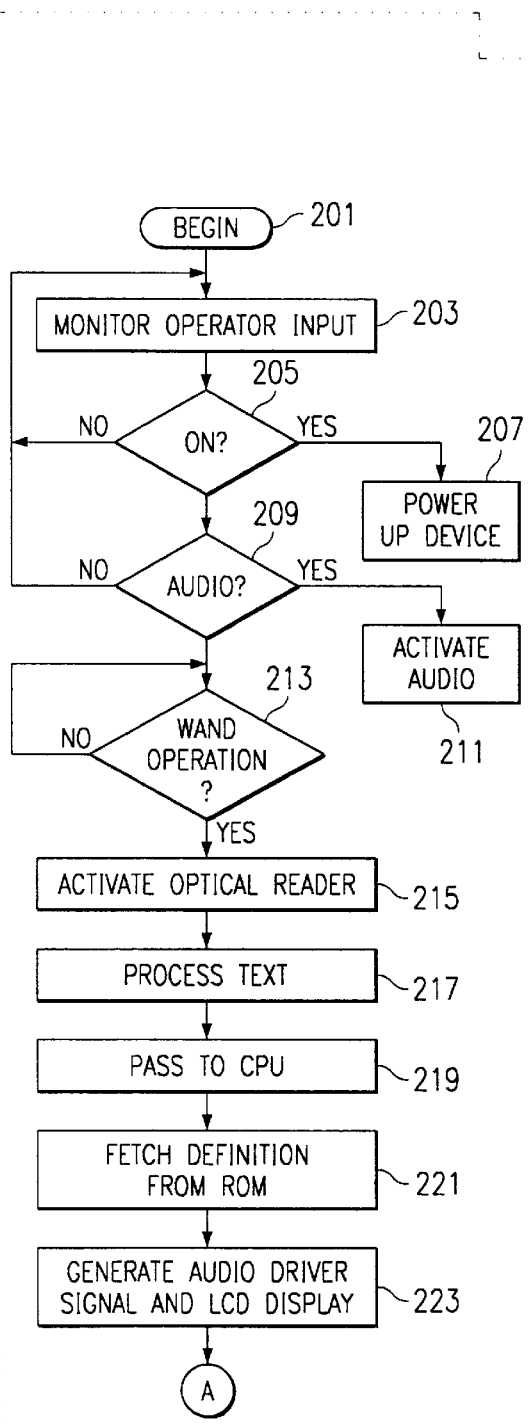
FIGS. 3A and 3B are flowchart representations of scanning operations utilizing the handheld scanner-dictionary of the present invention.
Figure 3B:
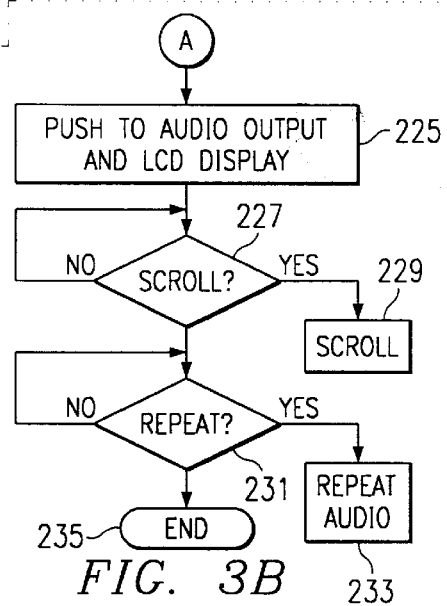

FIGS. 3A and 3B are flowchart representations of the scanning input mode of operation of the handheld scanner-dictionary of the present invention. The process begins at software block 201 and continues at software block 203, wherein operator input is monitored. In accordance with software blocks 205 and 209, the handheld scanner-dictionary monitors to determine whether the operator has turned the device on, and whether the operator has selected the audio output mode of operation. If the device is turned on, the power-up device software module 207 is activated. If the audio output is selected, the software module of activate audio 211 is activated. In accordance with software block 213, the handheld scanner-dictionary monitors operator input to determine whether a wand operation has commenced. In other words, the handheld scanner-dictionary determines whether a scanning operation has commenced. Once the scanning operation has been detected, the optical reader is activated in accordance with software block 215, the text is processed in accordance with software block 217, the text is passed to the CPU 101 in accordance with software block 219, and CPU 101 fetches the definition from ROM in accordance with software block 221. Next, in accordance with software block 223, the handheld scanner-dictionary generates an audio driver signal and an LCD display signal. In accordance with software block 225, these signals are pushed to the audio output device and to the LCD display. Then, in accordance with software blocks 227, 231, the handheld scanner-dictionary monitors operator input to determine whether scrolling operations have been requested. Additionally, the handheld scanner-dictionary monitors to determine whether a repeat of the definition has been requested. If those functions are requested, scrolling is performed in accordance with software block 229, and repeat of the audio messages is generated in accordance with software block 233. Finally, in accordance with software block 235, the process ends.

Figure 4A:
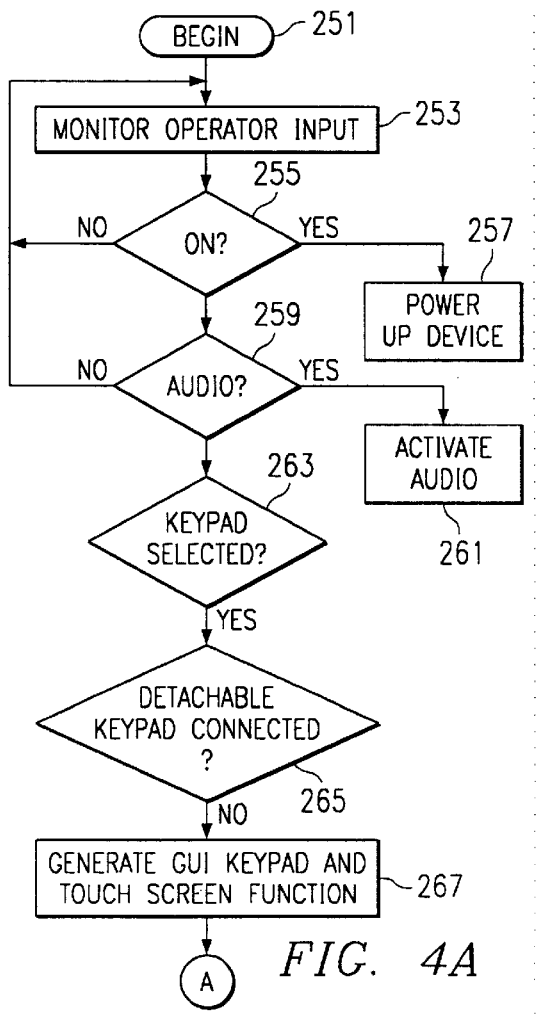
FIGS. 4A and 4B are flowchart representations of keypad input operations utilizing the improved handheld scanner-dictionary of the present invention.
Figure 4B:
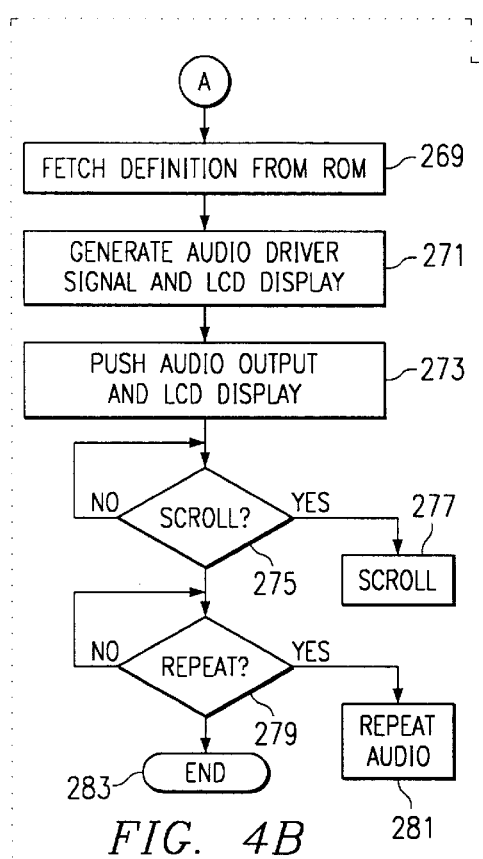

FIGS. 4A and 4B are flowchart representations of the keypad mode of operation. The process begins at software block 251 and continues at software block 253, wherein the handheld scanner-dictionary monitors for operator input. In accordance with software blocks 255, 257, 259, and 261, the handheld scanner-dictionary monitors for operator input, for powering up the device, and for activation of the audio output mode of operation. Then, in accordance with software block 263, the handheld scanner-dictionary monitors for operator selection of the keypad input. Then, in accordance with software block 265, the handheld scanner-dictionary monitors to determine whether the detachable keypad is connected. If the detachable keypad is not connected, control passes to software block 267, wherein the handheld scanner-dictionary generates a graphical user interface keypad and activates the touch-screen function in order to allow the operator to utilize a stylus (or, alternatively, his/her finger) in order to select characters as an input to the handheld scanner-dictionary. Next, in accordance with software blocks 269, 271, and 273, the CPU fetches the definition of the word from ROM, generates an audio driver signal and an LCD display signal, and pushes these signals to the audio output and to the LCD display grid. Then, in accordance with software blocks 275, 277, 279, and 281, the handheld scanner-dictionary monitors for operator selection of the scrolling function or repeating of the audio output of the definition of the input text. Then, the process ends at software block 283.

Figure 5B:
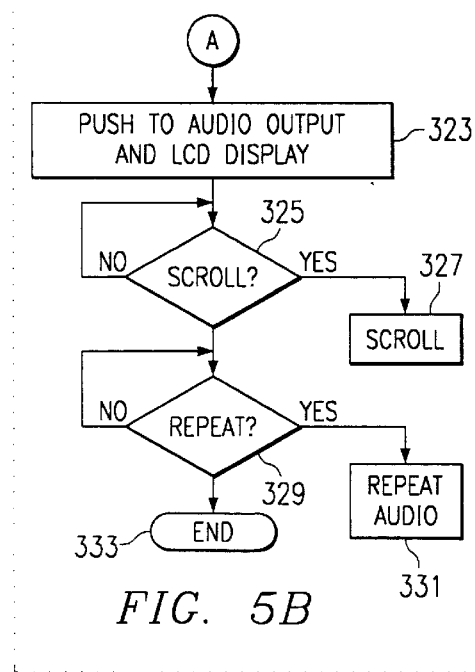
FIGS. 5A and 5B are flowchart representations of voice input operations utilizing the handheld scanner-dictionary of the present invention.
Figure 5A:
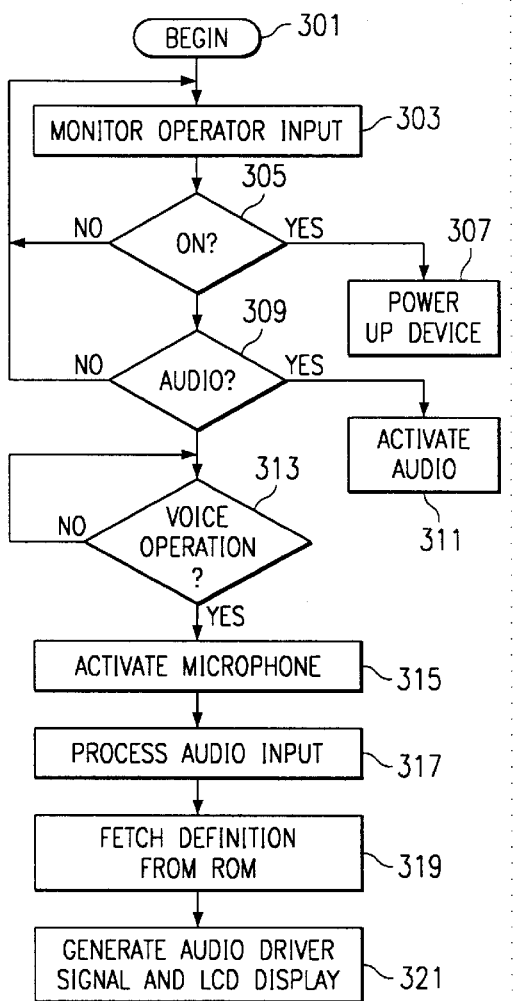

FIGS. 5A and 5B are flowchart representations of the voice-input mode of operation. The process begins at software block 301 and continues at software blocks 303, 305, 307, 309, and 311, wherein the handheld scanner dictionary monitors operator input and determines whether the operator has activated the handheld scanner-dictionary, and selected the audio output mode of operation. Then, in accordance with software block 313, the handheld scanner-dictionary monitors to determine whether the operator has selected a voice-input mode of operation. If so, the process continues at software block 315, wherein the handheld scanner-dictionary activates the microphone function. Next, in accordance with software block 317, the handheld scanner-dictionary processes the audio input and, in accordance with software block 319, fetches the definition of the input word from ROM. Then, in accordance with software block 321, the handheld scanner-dictionary generates an audio driver signal and an LCD display signal which is pushed to the audio output and LCD display in accordance with software block 323. Finally, in accordance with software blocks 325, 327, 329, and 331, the handheld scanner-dictionary monitors to determine whether the operator has selected the scrolling mode of operation or if the operator has requested a repeat playing of the audio output of the word definition. The process ends at software block 333.

Figure 6:
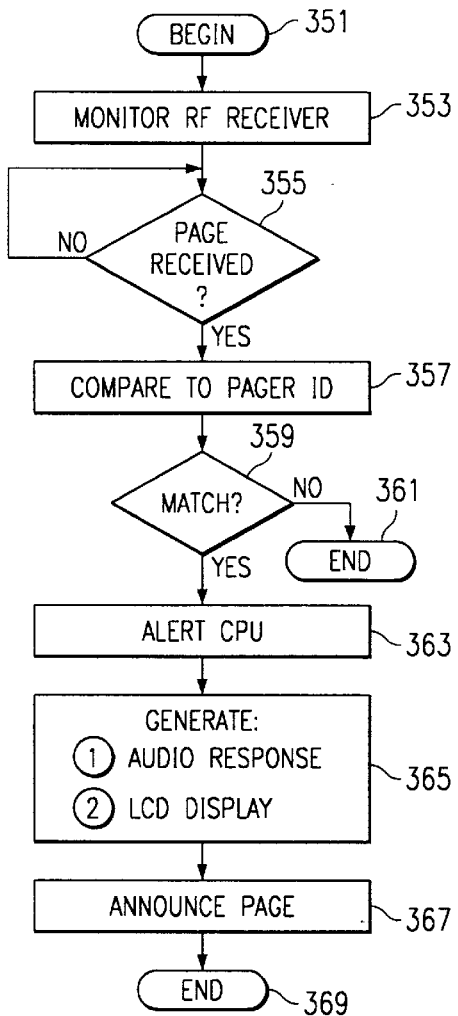
FIG. 6 is a flowchart representation of pager operations utilizing the handheld scanner-dictionary of the present invention.

FIG. 6 is a flowchart representation of the pager operation of the handheld scanner-dictionary in accordance with the present invention. The process begins at software block 351 and continues at software block 353, wherein the handheld scanner-dictionary monitors the radio frequency receiver. In accordance with software block 355, the handheld scanner-dictionary determines whether a page has been received. If so, control passes to software block 357, wherein the received page is compared to the pager ID. In accordance with software block 359, the handheld scanner-dictionary compares the two to determine whether a match occurs. If a match occurs, control passes to software 363, wherein the CPU is alerted to the incoming page. Then, in accordance with software block 365, the CPU generates an audio response and an LCD display of the page information, as is conventional. In accordance with software block 367, the handheld scanner-dictionary announces the page utilizing the audio response and LCD display, and the process ends at software block 369.

Figure 7:
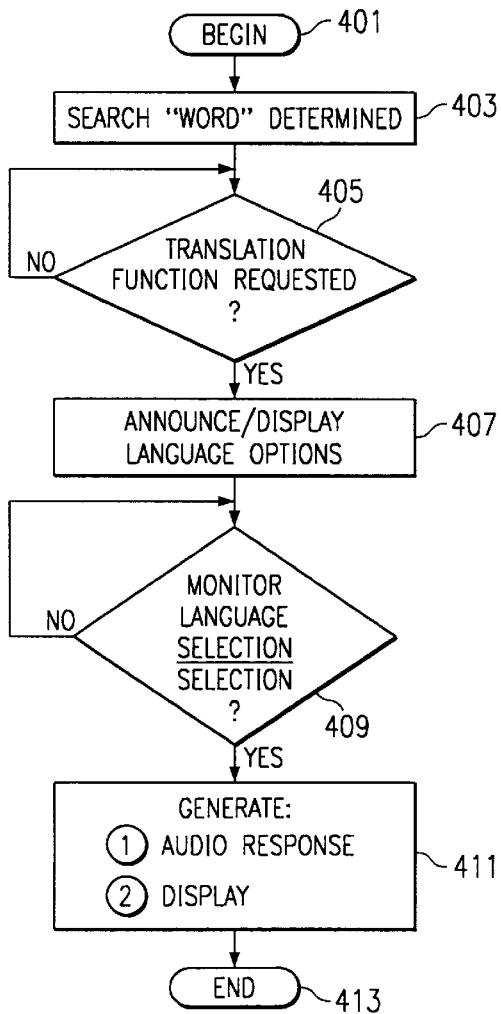
FIG. 7 is a flowchart representation of translation function operations utilizing the scanner-dictionary of the present invention.

FIG. 7 is a flowchart representation of the translation function of the handheld scanner-dictionary of the present invention. The process commences at software block 401 and continues at software block 403, wherein the handheld scanner-dictionary is provided with a search word. This search word may be received via the scanning input, the keyboard input, or the audio input, as discussed above. In accordance with software block 405, the handheld scanner dictionary determines whether the translation function has been requested. If so, control passes to software block 407, wherein the language options are announced or displayed. Then, in accordance with software block 409, the handheld scanner-dictionary monitors for the language selection. In this manner, a handheld scanner-dictionary may be programmed to provide translations into several different languages. In accordance with software block 411, an audio response and display is generated which provides the foreign language translation in both human-perceptible text in the display and human-perceptible audio output from the audio output device. The process ends at software block 413.

Figure 8:
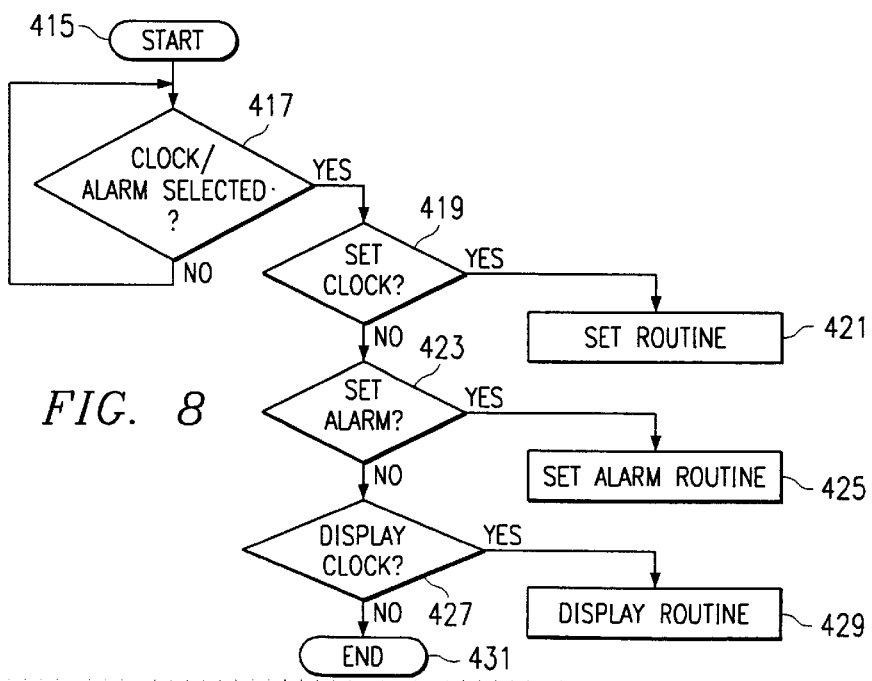
FIG. 8 is a flowchart representation of the clock and alarm functions utilizing the handheld scanner-dictionary of the present invention.

FIG. 8 is a flowchart representation of the clock/alarm function of the handheld scanner-dictionary of the present invention. The process begins at software block 415, commences at software block 417 wherein the handheld scanner-dictionary determines the clock/alarm has been selected. As is conventional with clock/alarm devices, user is presented with a variety of options, including setting the clock in accordance with software blocks 419, 421, setting the alarm in accordance with software blocks 423, 425, and displaying the clock according to software blocks 427, 429. The process ends at software block 431.

What is claimed is:

1. A handheld scanning dictionary apparatus, comprising:
   (a) a relatively small housing adapted in size to be held in one hand by a user during use;
   (b) a scanning input carried by said housing at a tapered distal end of said housing which allows text to be scanned as input during a wanding movement of a scanning input mode of operation with the scanning input in contact with the text and with the elongated housing held in one hand by such user and oriented generally transverse to a surface which carries such text, with said elongated housing out of contact with a surface which carries such text;
   (c) a display carried by said housing in general alignment with a longitudinal axis of said housing;
   (d) a controller disposed within said housing and operatively coupled to said scanning input, and said display; and
   (e) a program composed of instructions which are executable by said controller for receiving as an input text scanned by said scanning input and for providing as an output on said display text which is logically related to said input text in a predetermined manner wherein said output text is displayed on said generally elongated display in an orientation which is in general alignment with said longitudinal axis of said elongated housing with said leftmost portion of said output text located in a position generally proximate said scanning input thereby allowing said handheld scanning dictionary to be read by said user while held in one hand by said user during use.

2. A handheld scanning dictionary apparatus according to claim 1, wherein said program receives as an input text scanned by said scanning input and produces as an output on said display at least one dictionary definition related to said input.

3. A handheld scanning dictionary apparatus according to claim 1, wherein said program receives as an input text scanned by said scanning input and produces as an output on said display at least one translation related to said input.

4. A handheld scanning dictionary apparatus according to claim 1, wherein said relatively small housing comprises a rectangular and generally elongated housing which is adapted in size and shape to be held in one hand by a user during use.

5. A handheld scanning dictionary apparatus according to claim 1, further comprising:
an input connection for coupling to an external keyboard, and for providing textual input to said controller.

6. A handheld scanning dictionary apparatus according to claim 5, wherein said program includes instructions which are executable by said controller for alteratively receiving as an input text which is entered on a keyboard and which provides as an output on said display text which is logically related to said input text in a predetermined manner.

7. A handheld scanning dictionary apparatus according to claim 1, further comprising:
(f) at least one user control button carried by said housing and operable for providing at least one control command to said controller.

8. A handheld scanning dictionary apparatus according to claim 1, further comprising:
(f) an audio output device carried by said housing and operatively coupled to said controller; and
(g) a text-to-speech module coupled between said audio output device and said controller;
(h) wherein said program includes program instructions for receiving as an input text sinned by said scanning input and for producing as an output on said audio output device an audible output which is logically related to said input text in a predetermined manner.

9. A handheld scanning dictionary apparatus according to claim 8, wherein said program receives as an input text scanned by said scanning input and produces as an output on said audio output device at least one audible output definition related to said input in a predetermined manner.

10. A handheld scanning dictionary apparatus according to claim 8, wherein said program receives as an input text scanned by said scanning input and produces as an output on said audio output device at last one audible output translation related to said input in a predetermined manner.

11. A handheld scanning dictionary apparatus according to claim 8, further comprising:
an input connection for coupling to an external keyboard, and for providing textual input to said controller; and
wherein said program includes instructions which are executable by said controller for alteratively receiving as an input text which is entered on a keyboard and which provides as an output on said display text which is logically related to said input text in a predetermined manner.

12. A handheld scanning dictionary apparatus, according to claim 1, further comprising:
(f) a microphone input operatively coupled to said controller;
(g) a speech-to-text module for receiving a voice input from said microphone input and for providing a corresponding text input to said controller; and
(h) wherein said program includes program instructions for receiving as an input the output of said speech-to-text module and for producing as an output at least one of (a) an audible output on said audio output device which is logically related to said input text in a predetermined manner; and (b) a text output on said display which is logically related to said input text in a predetermined manner.

13. A handheld scanning dictionary apparatus according to claim 12, wherein said program produces as an output at least one definition related to said input.

14. A handheld scanning dictionary apparatus according to claim 12, wherein said program receives an output at least one translation related to said input.

15. A handheld scanning dictionary apparatus according to claim 12, further comprising:
an input connection for coupling to an external keyboard, and for providing textual input to said controller; and
wherein said program includes instructions which are executable by said controller for alteratively receiving as an input text which is entered on a keyboard and which provides an audible output on said audio output device which is logically related to said input text in a predetermined manner.

16. A hand held scanning dictionary apparatus according to claim 1, further comprising:
(g) a paging module operatively coupled to said controller.

17. A hand held scanning dictionary apparatus according to claim 1, further comprising;
(f) a set of program instructions executable by said controller for generating a touch screen graphical user input for receiving at least one input from user interaction with said display.

* * * * *

(12) EX PARTE REEXAMINATION CERTIFICATE (8137th)
United States Patent
Zwolinski

(10) Number: US 6,208,435 C1
(45) Certificate Issued: Apr. 5, 2011

(54) METHOD AND APPARATUS FOR PROVIDING A HANDHELD SCANNER-DICTIONARY APPARATUS

(75) Inventor: Jan Scott Zwolinski, Graford, TX (US)

(73) Assignee: Jan Scott Zwolinski, Greenville, SC (US)

Reexamination Request:
No. 90/007,306, Nov. 19, 2004

Reexamination Certificate for:
Patent No.: 6,208,435
Issued: Mar. 27, 2001
Appl. No.: 09/047,270
Filed: Mar. 24, 1998

Related U.S. Application Data

(60) Provisional application No. 60/041,534, filed on Mar. 25, 1997.

(51) Int. Cl.
*G06K 7/10* (2006.01)

(52) U.S. Cl. .................................. 358/473; 382/313
(58) Field of Classification Search .................. None
See application file for complete search history.

(56) References Cited

U.S. PATENT DOCUMENTS

| | | | |
|---|---|---|---|
| 4,240,748 A | 12/1980 | Blanc et al. | 356/138 |
| 4,393,460 A | 7/1983 | Masuzawa et al. | |
| 4,457,719 A | 7/1984 | Dittakavi et al. | 434/159 |
| 4,505,682 A | 3/1985 | Thompson | 434/335 |
| 4,621,325 A | 11/1986 | Naftzger et al. | 364/406 |
| 4,793,812 A * | 12/1988 | Sussman et al. | 434/116 |
| 4,864,302 A | 9/1989 | Bowers | 341/13 |
| 4,890,230 A * | 12/1989 | Tanoshima et al. | 704/3 |
| 5,053,612 A | 10/1991 | Pielemeier et al. | 235/462 |
| 5,063,508 A | 11/1991 | Yamada et al. | |
| 5,324,922 A | 6/1994 | Roberts | 235/375 |
| 5,648,760 A * | 7/1997 | Kumar | 340/825.25 |
| 5,857,156 A * | 1/1999 | Anderson | 455/517 |

| | | | |
|---|---|---|---|
| D424,547 S | 5/2000 | Seachuga | |

FOREIGN PATENT DOCUMENTS

| | | |
|---|---|---|
| JP | 61-067365 | 7/1986 |
| WO | WO97/01827 | 1/1997 |
| WO | WO98/03932 | 1/1998 |

OTHER PUBLICATIONS

U.S. Appl. No. 60/041,534, filed Mar. 25, 1997, Zwolinski.
Evdoxia Tsakiridou "Quicktionary—It Is Small And It Knows English", Published in Westdeutsche Allgemeine Zeitung (German Newspaper) Oct. 17, 1997.

(Continued)

*Primary Examiner*—Scott L. Weaver

(57) ABSTRACT

A handheld scanning dictionary is provided. It includes a relatively small housing adapted in size to be held in one hand by a user during use. A scanning input is carried by the housing preferably at a tapered distal end of the housing, which allows text to be scanned as input during a wanding movement of a scanning input mode of operation, with a scanning input in contact with the text, and with the elongated housing held in one hand by the user and oriented generally transverse to a surface which carries such text. The elongated housing is maintained out of contact with the surface which carries the text. A display is carried by the housing in general alignment with the longitudinal axis of the housing. The controller is disposed within the housing and operatively coupled to the scanning input and the display. A program is provided which is composed of instructions which are executable by the controller. It operates to receive as an input text scanned by the scanning input and to provide as an output on the display text which is logically related to the input text in a predetermined manner. Preferably the output text is displayed on the generally elongated display in an orientation which is in general alignment with the longitudinal axis of the elongated housing with the left-most portion of the output text located in a position generally proximate the scanning input, thereby allowing the handheld scanning dictionary to be read by the user while holding one hand during use.

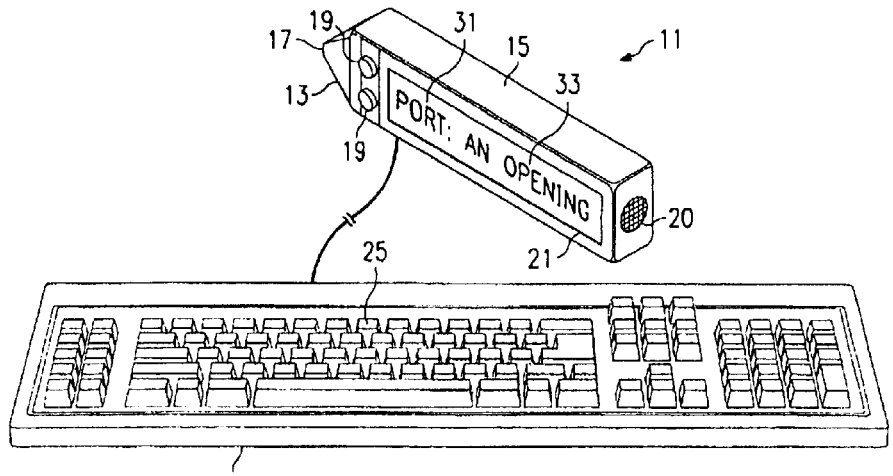

OTHER PUBLICATIONS

Hexaglott Quicktionary, Wirtschafts Woche, Dec. 4, 1997.

"Quicktionary—Translates a second language in a second", "Best of Byte" magazine advertisement, 1997.

"Quicktionary—Multi—Translates a second language in a second", "Best of Byte" magazine advertisement, 1997.

"Quicktionary statt Dictionary" article, MZ Publication, Mar. 19, 1997.

"Ubersetzen im Handumdrehen" arcticle, DOS publication, May 1997, p. 18.

"Cool Tool Wizcorn Quicktionary" article, "ZD Internet Professional", May 1997.

"Bild 5. Innovative Der Quicktionary liest englische Texte und ubersetzt sie ins Deutsche", "PC Anwender", May 1997 (picture), p. 12.

Alphascan LLC claim chart comparing Claim 1 of Zwolinski U.S. Patent No. 6,208,435 with Wizcom Quicklink and Quicktionary.

Quicktionary Reading Pen workbook, Wizcom Technologies, Ltd. (Jan. 1997) (selected pages).

Quicktionary Operating Manual, Wizcom Technologies, Ltd. (Jan. 1997) (pp. 1–16) (p. 1 begins with "Getting Started").

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are cancelled.

* * * * *